United States Patent
Gember et al.

(10) Patent No.: US 9,104,492 B2
(45) Date of Patent: Aug. 11, 2015

(54) CLOUD-BASED MIDDLEBOX MANAGEMENT SYSTEM

(75) Inventors: Aaron Robert Gember, Madison, WI (US); Robert Daniel Grandl, Madison, WI (US); Theophilus Aderemi Benson, Dorchester, MA (US); Ashok Anand, Madison, WI (US); Srinivasa Aditya Akella, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 354 days.

(21) Appl. No.: 13/602,791

(22) Filed: Sep. 4, 2012

(65) Prior Publication Data

US 2014/0068602 A1    Mar. 6, 2014

(51) Int. Cl.
G06F 9/455    (2006.01)
G06F 9/50    (2006.01)
H04L 12/46    (2006.01)

(52) U.S. Cl.
CPC .......... G06F 9/5072 (2013.01); G06F 9/45558 (2013.01); H04L 12/4633 (2013.01); G06F 2009/45595 (2013.01)

(58) Field of Classification Search
CPC .............. G06F 9/5072; G06F 9/45558; G06F 2009/45595; G06F 9/45533; G06F 9/5077; G06F 9/45537; G06F 9/445; H04L 12/4633
See application file for complete search history.

(56) References Cited

U.S. PATENT DOCUMENTS

| | | | |
|---|---|---|---|
| 8,095,668 B2 * | 1/2012 | Mitchell et al. | 709/228 |
| 8,155,116 B2 * | 4/2012 | Eriksson et al. | 370/389 |
| 8,468,259 B2 * | 6/2013 | Mitchell et al. | 709/228 |
| 8,489,751 B2 * | 7/2013 | Mitchell et al. | 709/228 |
| 8,762,501 B2 * | 6/2014 | Kempf et al. | 709/220 |
| 8,891,520 B2 * | 11/2014 | Alicherry et al. | 370/389 |
| 8,923,294 B2 * | 12/2014 | Chao et al. | 370/392 |
| 8,958,298 B2 * | 2/2015 | Zhang et al. | 370/235 |
| 2010/0115606 A1 | 5/2010 | Samovsky et al. | |
| 2013/0003735 A1 * | 1/2013 | Chao et al. | 370/392 |
| 2013/0013664 A1 * | 1/2013 | Baird et al. | 709/203 |
| 2013/0332983 A1 * | 12/2013 | Koorevaar et al. | 726/1 |
| 2014/0007088 A1 * | 1/2014 | Jamjoom et al. | 718/1 |
| 2014/0007094 A1 * | 1/2014 | Jamjoom et al. | 718/1 |

OTHER PUBLICATIONS

Joseph, Dilip A., et al., A Policy-aware Switching Layer for Data Centers, SIGCOMM '08, Aug. 17-22, 2008, pp. 51-62, Seattle, Washington.

Benson, Theophilus, et al., CloudNaaS: A Cloud Networking Platform for Enterprise Applications, SOCC '11, Oct. 27-28, 2011, Cascais, Portugal.

(Continued)

*Primary Examiner* — Van Nguyen
(74) *Attorney, Agent, or Firm* — Boyle Fredrickson, S.C.

(57) ABSTRACT

A virtual network virtual machine may be implemented on a cloud computing facility to control communication among virtual machines executing applications and virtual machines executing middlebox functions. This virtual network virtual machine may provide for automatic scaling of middleboxes according to a heuristic algorithm that monitors the effectiveness of each middlebox on the network performance as application virtual machines are scaled. The virtual machine virtual network may also locate virtual machines in actual hardware to further optimize performance.

19 Claims, 5 Drawing Sheets

(56) References Cited

OTHER PUBLICATIONS

Benson, Theophilus, et al., Epic: Platoform-as-a-Service Model for Cloud Networking, Computer Sciences Department, University of Wisconsin Madison, Technical Report #1686, pp. 1-14, Feb. 2011.

Meng, Xiaoqiao, et al., Improving the Scalability of Data Center Networks with Traffic-aware Virtual Machine Placement, Presented by Peter Izsak (236635) on the Management and Efficiency of Cloud Based Services, pp. 1-39, Dec. 8, 2010.

Benson, Theophilus, et al., Stratos: Virtual Middleboxes as First-Class Entities, CS Technical Reports, Citation TR1771, pp. 1-2, University of Wisconsin—Madison Department of Computer Sciences, Jun. 18, 2012.

* cited by examiner

CLOUD-BASED MIDDLEBOX MANAGEMENT SYSTEM

STATEMENT REGARDING FEDERALLY SPONSORED RESEARCH OR DEVELOPMENT

This invention was made with government support under 1050170 awarded by the National Science Foundation. The government has certain rights in the invention.

CROSS REFERENCE TO RELATED APPLICATION

--

BACKGROUND OF THE INVENTION

The present invention relates to cloud-based computing in which computer resources are provided in a scalable fashion as virtual machines and in particular to a method of implementing "middlebox" functionality in such cloud-based systems in a manner consistent with cloud-based computing.

"Middleboxes" are important components of large computer installations (e.g. data centers) having multiple computers executing applications such as Web servers, application servers, file servers or databases or the like (application computers). In this environment, middleboxes provide for network related functions such as the management of security (e.g., intrusion detection systems (IDS) and firewalls) and the enhancement of network efficiency (e.g., load balancers, WAN optimizers, and the like). Most simply, middleboxes may be directly wired in the path of data to the application computers with which they are associated. Middleboxes may be similarly installed by programming network switches used to control interconnections on the network joining the middleboxes and application computers.

Cloud computing presents an alternative to a private data center in which computing resources are flexibly provided on demand in the form of virtual machines that may, for example, implement the application computers of conventional computer installations. A cloud application manages the virtual machines so that users of the cloud can buy additional virtual machines at periods of high demand and return those virtual machines when the demand drops. By aggregating many users, significant economy of scale may be realized in terms of maintenance of the hardware, provision of physical resources such as power and cooling, and smoothing of peak demands.

It is known how to implement middlebox functions on virtual machines implemented in a cloud computing system. Installing such middlebox functions in the cloud, however, can be difficult because of the fluidity in the relationship between physical hardware and virtual machines, which may not be revealed or easily modified by the user. When additional virtual machines are purchased from the cloud application to meet peak demands, there is no simple mechanism for scaling middlebox virtual machines appropriately.

SUMMARY OF THE INVENTION

The present invention provides for a virtual network virtual machine (VNVM) that can run on a cloud system to manage the interconnection between application virtual machines (AVM) and middlebox virtual machines (MBVM). In different embodiments, the VNVM working in the cloud can automatically scale MBVMs efficiently as the number of AVMs changes. The VNVM may also control placement of the MBVMs on particular hardware to optimize network connections.

Specifically, in one embodiment the present invention operates in a computing system having a plurality of network connected computers implementing virtual machines and controlled by a cloud application that dynamically allocates virtual machines to different enterprises and monitors costs of the virtual machines against an account for each enterprise. At least one enterprise may include application virtual machines executing software to implement an application for the enterprise and middlebox virtual machines executing software enforcing rules related to transport of data between application virtual machines. The invention provides at least one virtual network virtual machine executing software to dynamically control a virtual network interconnecting the application virtual machines and middlebox virtual machines, the virtual network virtual machine intercommunicating with the application virtual machines and middlebox virtual machines to control the flow of data therebetween.

It is thus a feature of at least one embodiment of the invention to create a programmable data plane within a cloud environment that allows ready connection and reconfiguration of virtual middleboxes.

In one embodiment, the virtual network virtual machine may control the flow between application virtual machines and middlebox virtual machines by inter-communicating with the application virtual machines and middlebox virtual machines to establish tunnels on the network therebetween.

It is thus a feature of at least one embodiment of the invention to provide a mechanism for controlling data transport within a cloud environment without access to the internal controls of the cloud environment.

The tunnels may be between application virtual machines and middlebox virtual machines.

It is thus a feature of at least one embodiment of the invention to provide for a low overhead virtual network managed by tunnels implemented by each of the virtual machines to which they connect.

Alternatively the tunnels may be between the virtual network virtual machine and one of the application virtual machines or middlebox virtual machines.

It is thus a feature of at least one embodiment of the invention to provide a centralization of communication with the virtual network virtual machine that allows ready monitoring of network traffic, for example, in order to scale middleboxes with increased numbers of application virtual machines.

In this regard the virtual network virtual machine may further a performance metric of the enterprise by requesting additional middlebox virtual machines from the cloud application according to that monitoring.

It is thus a feature of at least one embodiment of the invention to allow automatic scaling of middleboxes in a manner analogous to the scaling that can be provided in a cloud environment for application computers.

The performance metric may be requests per second handled by at least one application virtual machine.

It is thus a feature of at least one embodiment of the invention to provide a performance metric that can be readily measured in that it does not require intimate understanding of the particular applications being executed or the middleboxes being traversed.

The virtual network virtual machine may further monitor a performance metric of at least one application virtual machine while changing a number of a middlebox virtual machines operating in parallel on a path of data flowing to at least one application virtual machine to determine where to increase a number of middlebox virtual machines on the path to at least one application virtual machine and adding middleboxes according to this determination.

It is thus a feature of at least one embodiment of the invention to provide a mechanism to automatically determine and correct chokepoints in the communication between middleboxes and application computers. By experimentally changing the number and location of middlebox virtual machines possible in a cloud environment, detailed understanding of the effects of such changes need not be characterized.

The virtual network virtual machine may implement a virtual network to provide a splitting of data directed to multiple middlebox applications by splitting of data preferentially, assigning new data flows to a new middlebox until flows to the parallel middleboxes are substantially equal.

It is thus a feature of at least one embodiment of the invention to rapidly balance data flow between middleboxes that are dynamically added.

The plurality of network connected computers may be connected in a hierarchy of sub-networks wherein the virtual network virtual machine may further communicate with the cloud application to control placement of the middlebox virtual machines in particular sub-networks according to at least one of: (a) intended connections of middlebox virtual machines to associated application virtual machines on the virtual network so that middlebox virtual machines are close to associated application virtual machines on the physical network; (b) a prediction of scaling required by middlebox virtual machines so that middlebox virtual machines requiring substantial future scaling are separated from other middlebox virtual machines requiring substantial future scaling; and (c) a ratio of input to output traffic for middlebox virtual machines so that middlebox virtual machines with a high ratio are close to virtual machines providing input to the middlebox virtual machine with a high ratio.

It is thus a feature of at least one embodiment of the invention to augment the cloud application to control the placement of virtual machines within underlying computer hardware for improved enterprise performance.

The virtual network virtual machine may control placement of the middlebox virtual machines within the sub-networks by at least one of: (a) encouraging placement of virtual machines in the same sub-network by making the virtual machines the same size; and (b) encouraging placement of virtual machines in the same sub-network by instantiating them at the same time.

It is thus a feature of at least one embodiment of the invention to provide a strategy for controlling placement of virtual machines in underlying computer hardware without access to the internal configuration of the cloud.

These particular objects and advantages may apply to only some embodiments falling within the claims and thus do not define the scope of the invention.

DETAILED DESCRIPTION OF THE PREFERRED EMBODIMENT

Figure 1:
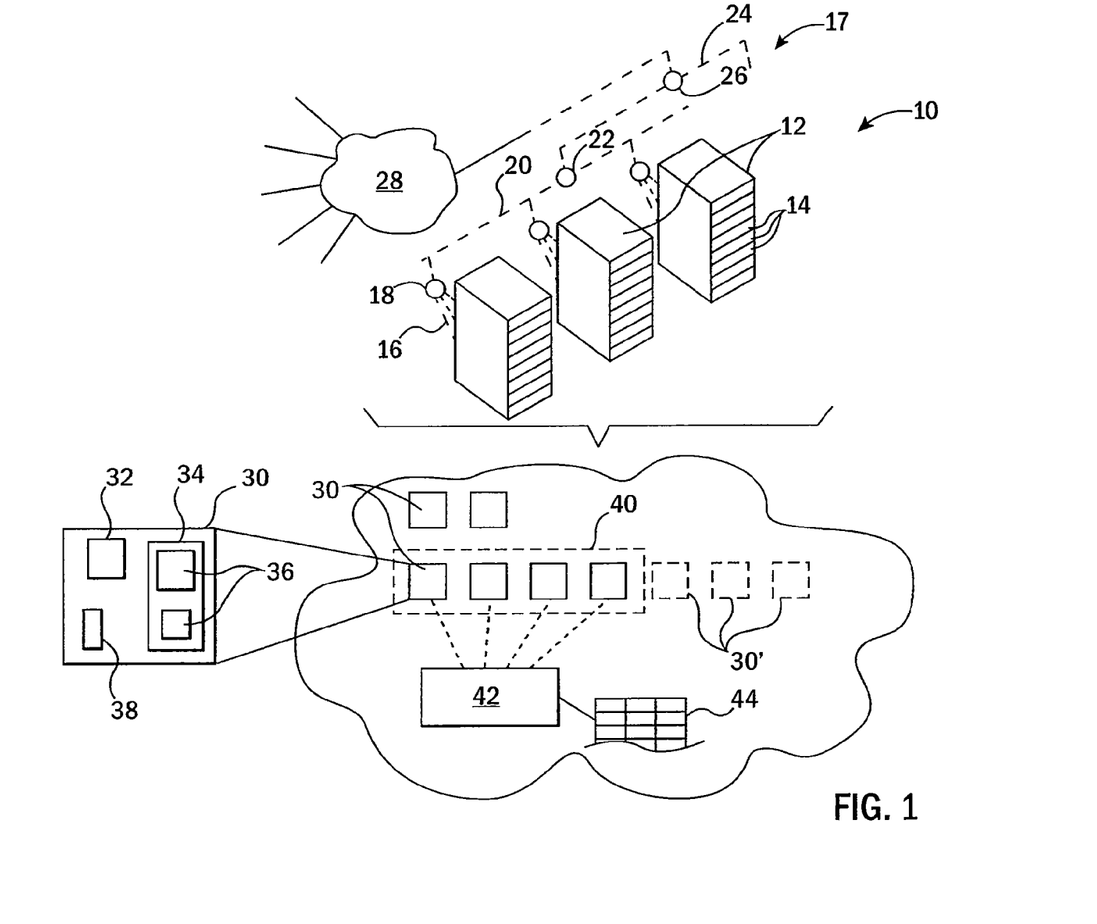
FIG. 1 is a simplified representation of an installation of network servers on multiple racks communicating through hierarchical sub-networks with the Internet such as may provide a set of virtual machines organized in enterprise each providing virtual processing and memory capabilities as managed by a cloud application in real time.

Referring now to FIG. 1, a cloud computing facility 10 may provide for a set of server racks 12 each holding multiple servers 14 intercommunicating on a rack network 16, for example, managed by network switch 18 and being a sub-network of network 17. The cloud computer facility may, for example, provide "Infrastructure as a Service" (Iaas) functionality. As is generally understood in the art, each of the servers 14 provide a high-speed electronic computer including a processor having one or more cores, a memory system including RAM and disk or other memory, and a network card for interconnecting to the network 16.

Multiple racks 12 may intercommunicate on inter-rack network 20 being a sub-network of network 17 managed, for example, by switch 22. Further, multiple sets of racks 12 may communicate on a facility network 24 being a higher sub-network of network 17 managed by backbone switch 26, for example, communicating with the Internet 28 or the like. Placement of the racks 12 in close proximity allows sharing of infrastructure such as electrical service, cooling maintenance and the like.

The servers 14 may implement a set of virtual machines 30, for example, using well-known virtualization programs such as VMWare commercially available from VMWARE, Inc. of Palo Alto, Calif. As is understood in the art, each of the virtual machines 30 provides a virtual processor 32 that may communicate with a memory space 34 unique to the virtual machine 30 and one or more virtual network ports 38 allowing the virtual machine 30 to communicate with the Internet 28. The memory space 34 for each virtual machine 30 may hold one or more programs 36 unique to that virtual machine 30 executed by the virtual processor 32.

Generally, the virtual machines 30 may be collected together in enterprise 40 associated with a particular user (cloud tenant) contracting to obtain services provided by the virtual machines 30. A cloud application 42 typically implemented by one or more servers 14 provides management of the virtual machines 30 of enterprise 40 and, in particular, allows for the purchase of additional virtual machines 30' by an enterprise 40 to meet fluctuating demand. As additional virtual machines 30' are purchased or released, the cloud application 42 maintains a charge ledger 44 to charge the enterprise appropriately for the additional resources represented by the virtual machines 30.

Figure 2:
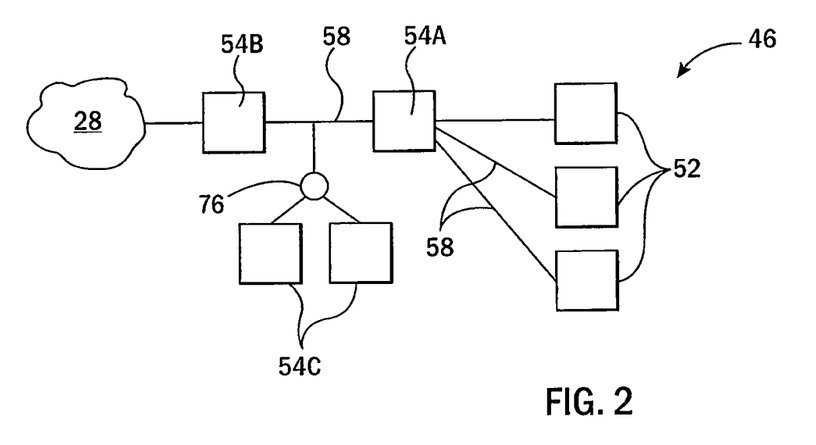
FIG. 2 is a block diagram of a simplified server topology including multiple middleboxes and servers such as may be implemented by virtual machines.

Referring now to FIG. 2, an example enterprise 40 may include one or more application machines 52 communicating with the one or more middleboxes 54 positioned to receive data passing between the application machines 52 and the Internet 28. The middleboxes 54 may include load-balancing middlebox 54a receiving data from a wide area network (WAN) optimizer middlebox 54b connected to the Internet 28. The WAN optimizer middlebox 54b may mirror data to one or more intrusion detection systems (IDS) middleboxes 54c by means of distribution point 76 which distributes all data it receives to all elements following that point 76. Generally the distribution points 76 may be either a mirror (as shown in FIG. 2) or may divide data traffic to the downstream elements as will be described below. Generally there need be no specific virtual machine 30 for a distribution point 76 but rather they may be implemented in the upstream and/or downstream elements. These middleboxes 54 may be connected by a network 58 having a topology represented by the lines between the elements of the middleboxes 54, the application machines 52 and the distribution point 76.

As is generally understood in the art, a WAN optimizer middlebox 54b may implement a variety of optimization techniques to increase data transmission efficiencies over the network 58 to the application machines 52, for example, by eliminating redundant data transfer, compression of data, caching and the like. The IDS middlebox 54c may monitor traffic flowing over the network 58 to detect malware or network intrusions or the like. The load balancer middlebox 54a may distribute requests by users to the various application machines 52 while preserving consistent communication threads with any given user.

Figure 3:
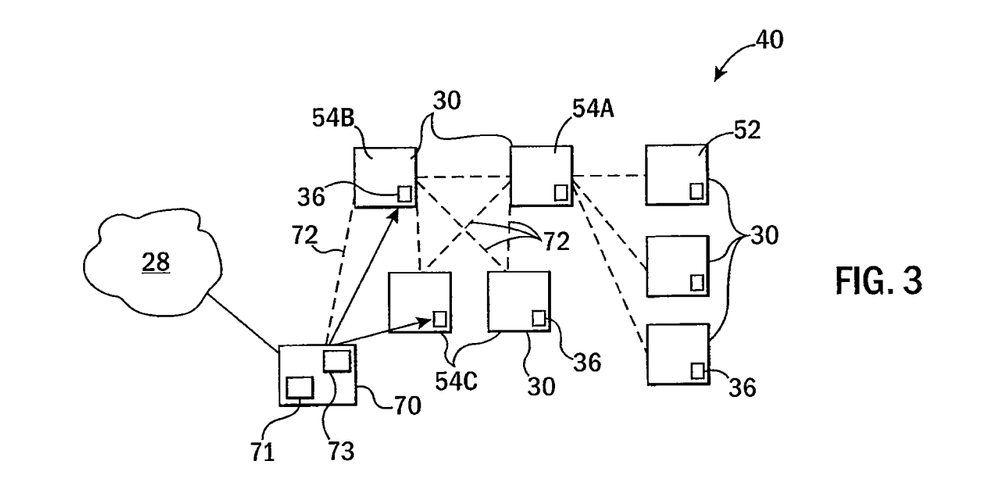
FIG. 3 is a block diagram similar to FIG. 2 showing a virtual network virtual machine of the present invention controlling an interconnection of virtual machines to implement the topology of FIG. 2 by direct tunneling.

Referring now to FIG. 3, each of the middleboxes 54a, 54b and 54c and the application machines 52 may be implemented on virtual machines 30 by programs executed by the virtual machines 30. While generally the cloud computing facility 10 provides an automatic connection of virtual machine 30 to the Internet 28, interconnection between virtual machines 30 is not naturally under user control, particularly to the extent that it may interfere with the addition or subtraction of virtual machines 30 from the enterprise 40 by the cloud application 42.

In this regard, the present invention provides for an internal routing of the data between the virtual machines 30 by the use of a virtual network virtual machine (VNVM) 70 which may, in some embodiments, establish tunnels 72 between the virtual machines 30 to enforce the communication topology of the network 58 shown in FIG. 2. As is understood generally in the art, tunnels 72 package data intended for transfer between two virtual machines 30 observing a first protocol and addressing, inside of packets of a possibly different network protocol and possibly different addressing. In this case, the VNVM 70 packages the Ethernet traffic to be communicated between the virtual machines 30 in an UDP tunnel implementing a point-to-point address between the particular virtual machines 30 providing the functions of the middleboxes 54a, 54b, and 54c and the application machines 52. The tunnels 72 thus provide a programmable data plane implementing the network 58.

The VNVM 70 may establish the tunnels using a high-level script 71 prepared by a user to define the desired topology of network 58 and executed by a configuration program 73 running on the VNVM 70. The high-level script 71 may abstract the topology of network 58 as external nodes, application machine, middleboxes, selects, and distribution points. Each of these components is shown generally in FIG. 2 except for selects. A select defines a particular path through the network based on characteristics of the data such as header fields or data values. A script 71 defining a network 58 follows rules of all paths beginning and ending with either an external node or an application machine. Zero or more middlebox elements may be placed between two endpoints.

In this regard, the VNVM provides a simple configuration tool and implements the desired network 58 by communicating with the virtual machines 30 to determine their addresses and then programming the virtual machines 30 so that the tunneling protocol may be executed as programs 36 on each of the virtual machines 30. The connection to the Internet 28 may be assigned to the first middlebox 54b or as shown to the VNVM 70, this latter approach allowing consistency in the public IP address used by the enterprise 40 even with changes in the configuration of the virtual machines 30. In this embodiment, the tunneling is directly between connected virtual machines 30 to be implemented in a distributed fashion with relatively low overhead on each virtual machine 30.

Figure 4:
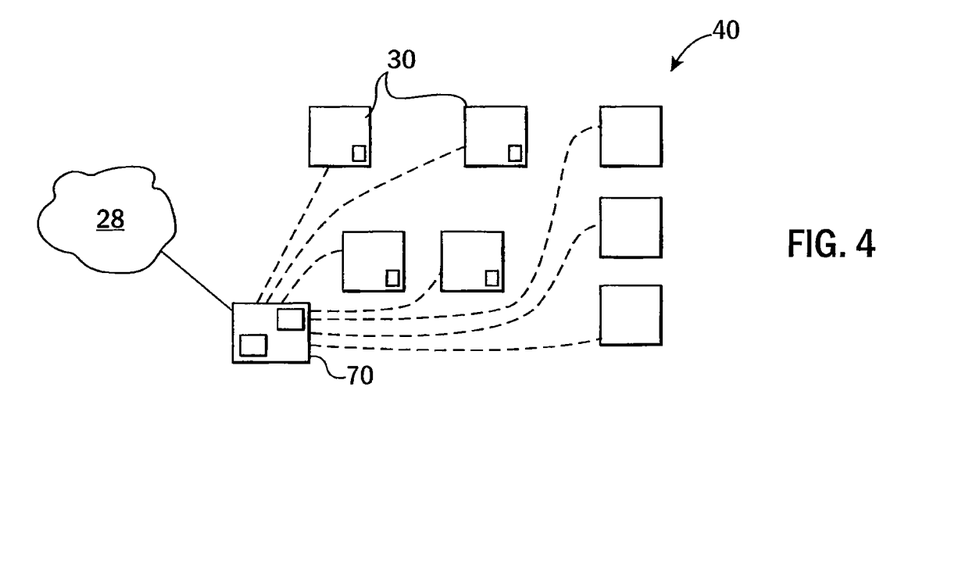
FIG. 4 is a block diagram similar to FIG. 3 showing an alternative tunneling system that provides centralized performance metrics to the virtual network virtual machine by indirect tunneling.

Referring now to FIG. 4 in an alternative embodiment, tunnels may be established between each of the virtual machines 30 of the enterprise 40 and the VNVM 70 which receives data directly from the Internet 28. This centralized approach provides the advantage of allowing the VNVM 70 to monitor traffic and possible traffic bottlenecks which may be used to dynamically scale the middleboxes as will be described below.

Figure 5:
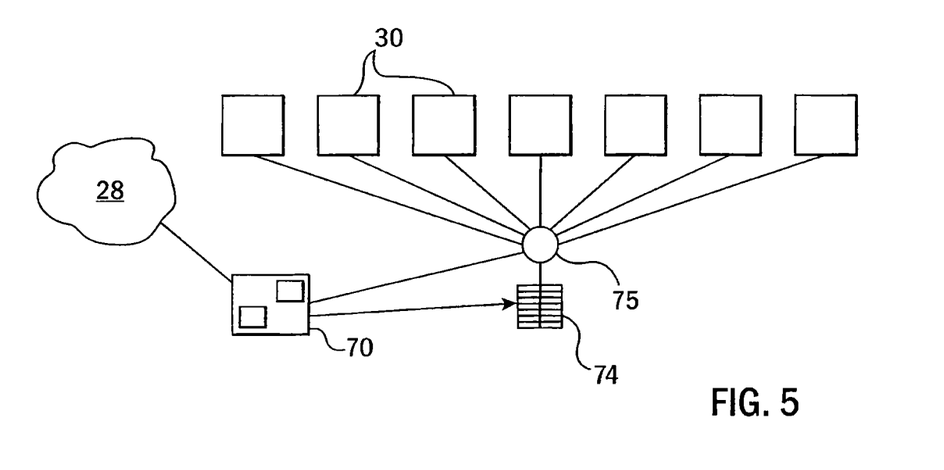
FIG. 5 is a block diagram showing an alternative method of controlling interconnection of virtual machines by programmable switches typically accessible only by the cloud provider.

Each of the above two approaches may be implemented without the need for particular configuration services to be offered by the cloud provider with respect to internal routing. Each of the virtual machines 30 may include program images provided by the user at the time of the instantiation of the virtual machines 30 which causes them to expose their actual addresses to the VNVM 70 for the creation of the necessary tunneling. Alternatively and referring to FIG. 5, the cloud provider may provide a configuration service allowing the interconnecting of the virtual machines 30 providing application machines 52 and the middleboxes 54 (and thus implementation of the topology of network 58) through the use of a programmable routing switch 75 (implementing switches 18, 22, and 26 described above) each having a routing table 74. In this case the VNVM 70 may implement the network 58 by loading the routing tables 74 with the necessary connections between virtual machines 30. In yet an additional embodiment, a combination of tunneling and software switch routing may be employed to keep from overloading the capabilities of the switches 75 or the virtual machines 30.

Figure 6:
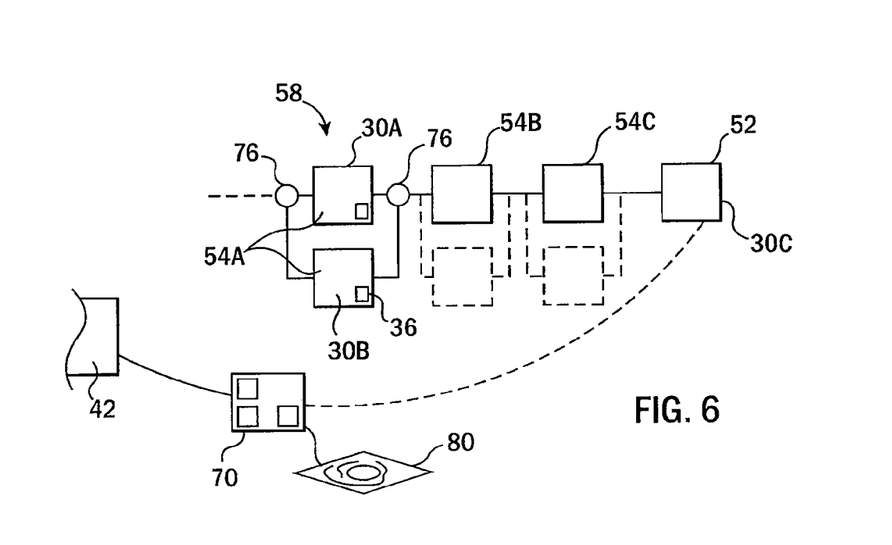
FIG. 6 is a logical diagram showing interconnected virtual machines implementing middlebox and application functionality showing a method employable by the virtual network virtual machine of the present invention to scale middlebox virtual machines dynamically.

Referring now to FIG. 6, one benefit of implementing the VNVM 70 as a virtual machine 30 within the cloud computing facility 10 is that it may communicate directly with the cloud application 42 to instantiate additional virtual machines 30 to implement a scaling of the middleboxes 54 as well as a scaling of the application machines 52. This automatic scaling of middleboxes 54, however, can present some challenges with respect to determining what middleboxes 54 to scale. Because an individual middlebox 54 will typically serve multiple application machines 52 and respond differently to traffic changes in the application machines 52, a simple matching of the scaling of middleboxes 54 and application machines 52 will be inefficient and unnecessarily expensive. Determining an a priori scaling for each type of middlebox 54, however, is undesirably complicated and limits the user's ability to freely use new and varied middleboxes 54. In addition, chokepoints in processing may not be caused solely by the absence of virtual machines 30 for executing middlebox 54 but may result from network congestion or the like or the unknown sharing of underlying hardware of the virtual machines 30. Accordingly simple scaling of middleboxes 54 may not produce cost-effective benefits.

Accordingly, as shown in FIG. 6, the present invention in one embodiment adopts a heuristic approach in which the VNVM 70 iteratively increases the presence of each particular middlebox 54 in order to evaluate the effect of that middlebox 54 on a performance metric of the enterprise 40. For example, in a simple network 58 providing for the series connection of middlebox 54*a*, middlebox 54*b*, and middlebox 54*c*, the VNVM 70 may implement a loop in which it duplicates each middlebox 54 to measure the change in performance metric before deciding whether to keep one or more duplicates of each middlebox 54 for a longer time period.

For example, middlebox 54*a* implemented by virtual machine 30*a* may be duplicated to provide middlebox 54*a* implemented by virtual machine 30*b* in parallel with virtual machine 30*a*. This duplication involves purchase of an additional virtual machine 30*b* from the cloud application 42 (shown in FIG. 1). The VNVM 70 then monitors a change in the performance of the application machine 52 implemented by virtual machine 30*c*. In one embodiment, this performance metric may be requests per second handled by the application machine 52.

If, with the addition of the middlebox 54*a* of virtual machine 30*b*, the metric is improved, that new virtual machine 30*b* is retained. The process then tries to instantiate yet another new middlebox 54*a* using a new virtual machine 30*d* (not shown but in parallel with virtual machines 30*a* and 30*b*). When no improvement is obtained for any added virtual machine 30, that virtual machine 30 is then returned or de-instantiated and the process moves to the next middlebox 54*b* then 54*c* to repeat these steps of adding virtual machines 30 in parallel.

When the last middle box 54*c* is reached and a decision is made to discard an added virtual machine 30, the process is repeated starting again at middle box 54*a* if any new virtual machines 30 were added. Otherwise the process stops until the performance metric of the enterprise 40 decreases, at which point the process is repeated.

Generally in the above process, the VNVM 70 will purchase an additional virtual machine 30 to be used for the middlebox 54 if the increase in performance metric is above a predetermined threshold, for example, expressed in requests per second. This predetermined threshold may thus establish whether it is justified to purchase additional virtual machines 30. It will be appreciated that other performance metrics may be employed including, for example, request response times, number of simultaneous application sessions served or the like. Scaling may also terminate early if adding more middleboxes would exceed a budget limit for the purchase of virtual machines. The search space for the heuristic is limited by the fact that it may start with the current configuration of the topology of the network 58 and explore one dimension at a time, that is, the scaling of one type of middlebox 54. With a typically more complex topology of network 58, the recording of the performance metrics by the VNVM will result in a data space map 80 in multiple dimensions N equal to the number of middleboxes 54. A variety of different optimization techniques, including the greedy heuristic described above may be used. The centralized control of the VNVM 70 and its ability to reconfigure the virtual network connecting the virtual machines 30 allows this scaling process to be conducted on a continuous basis automatically.

In some embodiments, the reconfiguration of middleboxes 54 will be triggered only occasionally at the times of changes in the number of application machines 52.

Scaling down of middle boxes occurs in a similar fashion, beginning at the end of a series of middleboxes and working in reverse, removing one middlebox at a time to see if a significant drop in the metric occurs. If no significant drop in the metric occurs, then the middlebox instance may be discarded, otherwise it is re-added to the topology and the process moves to the previous middlebox in the series. To prevent a constant loop of scaling up and scaling down, the scaling up and scaling down procedures are repeated only after a predetermined delay time.

When additional middleboxes 54 are instantiated, dividing network data among the virtual machines 30*a* and 30*b* for the duplicated middleboxes 54 can be performed by the VNVM 70 by programming splitter distribution points 76 into the network 58. These splitter distribution points 76 do not require their own virtual machines 30 but may be implemented by the programs 36 of the connected virtual machines 30 implementing the tunneling protocol. It is important that a newly instantiated middlebox 54 used for accommodating a dynamic load rapidly assume its portion of the load in order to eliminate any bottleneck when the middlebox 54 is instantiated for that purpose and/or during the heuristic measurement process described above. In one embodiment, the division of dataflow is implemented according to a weighted round-robin approach. In this approach, for every new dataflow assigned to the existing middlebox 54 in virtual machines 30*a*, two new dataflows are assigned to the new middlebox 54 in newly instantiated virtual machines 30*b*. This weighted round-robin allocation continues until the number of data flows assigned to each instance of virtual machines 30*a* and virtual machines 30*b* is approximately equal and then a regular unweighted round-robin is performed until the next scaling of an application machine 52.

Figure 8:
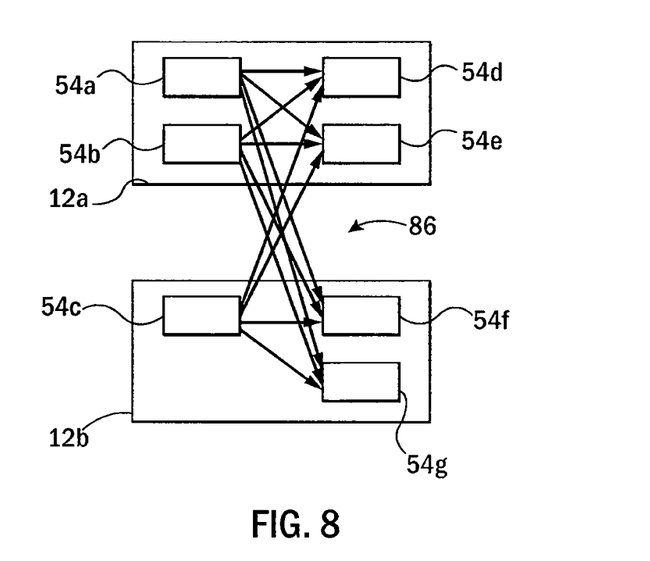
FIGS. 8 and 9 are simplified logical representations of middleboxes as distributed among racks showing inter-rack communication with different traffic splitting techniques.

This unweighted round-robin distribution is shown generally in FIG. 8 where middlebox instances 54*a-c* evenly distribute traffic to middle box instances 54*d-g*. In this case, where middlebox instances 54*a*, 54*b*, 54*d*, and 54*e* are in a first rack 12*a*, and middlebox instances 54*c*, 54*f* and 54*g* are in a second rack 12*b*, significant inter-rack traffic 86 is generated, generally slowing the response of the system. Thus for example, if N data flows arrive at each of the middle boxes 54*a-c*, each of the middle boxes 54*d-f* under this scheme receive 3N/4 data flows and the traffic between racks equals 3N/2. This approach may be implemented without access to the internal configuration of the cloud.

Figure 9:
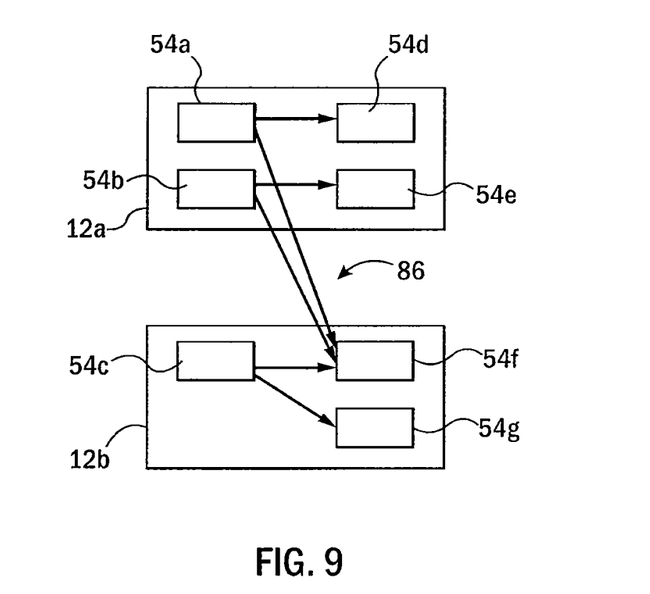

Referring now to FIG. 9, a network-aware flow distribution provides a weighting of the distribution so that middleboxes in a given rack prefer routing to other devices in the rack. In this example, each of the middleboxes 54*d-f* may still receive 3N/4 data flows but the traffic between racks equals N/2. Optimizing this weighting system can be done in a number of ways including linear programming which incorporates the relative costs of inter-rack communication.

Figure 7:
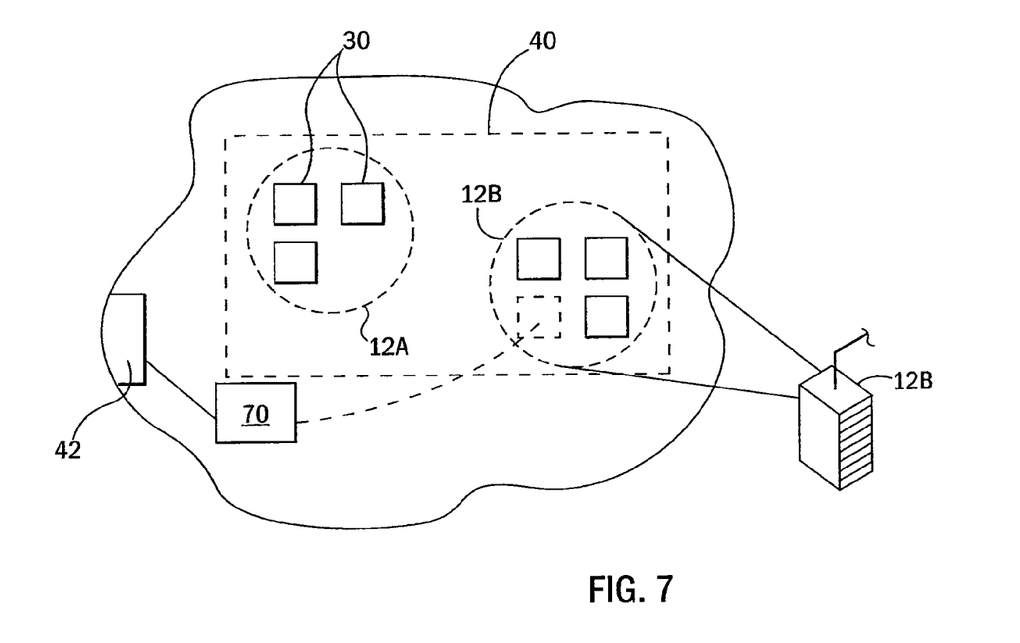
FIG. 7 is a logical representation of the implementation of a set of virtual machines associated with server racks and showing a method of implementing new virtual machines in particular racks to improve enterprise functions.

Referring now to FIGS. 1 and 7, the present invention contemplates that the VNVM 70 may further optimize the delivery of services to enterprise 40 by controlling the placement of virtual machines 30 into particular locations on the network 17 to generally collect certain virtual machines 30 into given sub-networks, it being understood that communications within sub-networks are faster and less prone to congestion than communication across sub-networks. By consolidating some virtual machines 30 and their associated middleboxes 54 and application machines 52 in particular racks 12, for instance, the necessity of traversing multiple switches 18, 22 and 26 may be avoided.

In this regard, the VNVM 70 may make use of the user-specified topology of network 58 (implemented by the script configuration program 73) as well as information regarding the input and output traffic ratio of any middlebox 54 (that is the inherent compression performed by the middlebox 54) and the likelihood that the middlebox will need to be scaled in the future (such as may be determined by historical data collected by the VNVM 70 or as may be input by the user). The input and output traffic ratio reflects, for example, the decrease in output traffic from a WAN optimizer compared to its input traffic.

The placement optimization implemented by VNVM 70 may work by first determining how to cluster virtual machines 30 of the enterprise 40 so that most of the communication resides within a few racks. The placement optimization starts with a single cluster that contains all N virtual machines 30 of the enterprise 40. If any rack 12 in the cloud computing facility 10 has unused capacity on the severs 14 in the rack 12 for at least N virtual machines 30, then all of the virtual machines 30 of the enterprise 40 are placed on the servers 14 in the rack 12. If no rack 12 in the cloud computing facility 10 has unused capacity for N virtual machines, then the single cluster is split into two clusters of size $N_1$ and $N_2$ using a min-cut algorithm. If any two racks 12 each have unused capacity for at least $N_1$ and $N_2$ virtual machines 30, then the virtual machines 30 of the enterprise 40 are placed in the two racks 12 based on the clustering. If no two racks 12 have sufficient capacity, then the virtual machines 30 of the enterprise 40 are split into a larger number of clusters. The process is repeated until the virtual machines 30 of the enterprise 40 are split into K clusters using a K-min-cut algorithm and placed into K racks 12.

The scaling factor is used to restrict the number of virtual machines 30 that can be placed on a single rack so as to reserve space for future scaling. When the virtual machines 30 must be divided into K clusters, where K is greater than one, and more than one rack has sufficient capacity to hold the virtual machines in one of the K clusters, a rack is chosen that minimizes the number of switches 22 and 26 that traffic needs to cross to reach the racks where the other clusters are located. As new middlebox instances are formed (resulting in the instantiation of new virtual machines 30) they can be placed in the rack 12 according to the similar criteria and to minimize inter-rack traffic through switches 22 and 26 and generally traffic that needs to cross sub-networks. Generally, if the new middlebox instance can be placed in the same rack 12 that holds the virtual machines 30 providing its input and receiving its output, this is done. However if the input and output virtual machines 30 exist in separate racks 12, the new virtual machine 30 is placed according to its input and output ratio; that is, if the ratio is greater than one, the new virtual machine 30 would be placed in the same rack as the input virtual machine 30 and otherwise would be placed in the same rack as its output virtual machine 30.

Cloud providers normally do not provide direct control over placement of newly instantiated virtual machines 30 and in such cases the VNVM 70 attempts to indirectly influence placement of the new virtual machines 30 by allocating virtual machines 30 of the same size when it is desired that the new virtual machines 30 be placed in the same rack 12, and allocating virtual machines 30 in different sizes when it is not desired that they be placed in the same rack 12. In addition, virtual machines 30 that are intended to be placed in the same rack 12 may be instantiated or launched at about the same time to be more likely to be placed nearby. Conversely virtual machines 30 that are intended to be separated may be launched at different times.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a machine" and "a virtual machine" or "a computer" and "a processor," can be understood to include one or more virtual machines or underlying processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A computing system comprising a plurality of network connected computers implementing virtual machines and controlled by a cloud application that dynamically allocates virtual machines to different enterprises and monitors costs of the virtual machines against an account for each enterprise; the virtual machines for at least one enterprise including:
   (1) application virtual machines executing software to implement an application for the enterprise;
   (2) middlebox virtual machines executing software enforcing rules related to transport of data between application virtual machines; and
   (3) at least one virtual network virtual machine (VNVM) executing software to dynamically control a virtual network interconnecting the application virtual machines and middlebox virtual machines;

wherein the at least one VNVM:
(i) intercommunicates with the application virtual machines and middlebox virtual machines to control a flow of data therebetween;
(ii) monitors a performance metric of the enterprise to request additional middlebox virtual machines from the cloud application according to that monitoring; and
(iii) monitors a performance metric of the enterprise to determine where among multiple locations to add additional middlebox virtual machines to the enterprise according to that monitoring.

2. The computing system of claim 1 wherein the VNVM controls the flow between application virtual machines and middlebox virtual machines by inter-communicating with the application virtual machines and middlebox virtual machines to establish tunnels on the network therebetween.

3. The computing system of claim 2 wherein the tunnels are between application virtual machines and middlebox virtual machines.

4. The computing system of claim 2 wherein the tunnels are between the VNVM and one of the application virtual machines and middlebox virtual machines.

5. The computing system of claim 1 wherein the performance metric is requests per second handled by at least one application virtual machine.

6. The computing system of claim 1 wherein the VNVM further monitors a performance metric of at least one application virtual machine while changing a number of middlebox virtual machines of a given type operating in parallel on a path of data flowing to at least one application virtual machine to determine where to increase a number of middlebox virtual machines on the path to at least one application virtual machine and adding middleboxes according to this determination.

7. The computing system of claim 1 wherein the VNVM intercommunicates with the application virtual machines and middlebox virtual machines to provide a splitting of data directed to multiple middlebox applications operating in parallel on a path of data flowing to at least one application virtual machine, the splitting of data preferentially assigning new data flows to a new middlebox until flows to the parallel middleboxes are substantially equal.

8. The computing system of claim 1 wherein the plurality of network connected computers are connected in a hierarchy of sub-networks and wherein the VNVM further
(iii) communicates with the cloud application to control placement of the middlebox virtual machines in particular sub-networks according to at least one of:
(a) intended connections of middlebox virtual machines to associated application virtual machines on the virtual network so that middlebox virtual machines are close to associated application virtual machines on a physical network;
(b) predicted scaling required by middlebox virtual machines so that middlebox virtual machines requiring substantial future scaling are separated from other middlebox virtual machines requiring substantial future scaling; and
(c) a ratio of input to output traffic for middlebox virtual machines so that middlebox virtual machines with a high ratio are close to virtual machines providing input to the middlebox virtual machine with a high ratio.

9. The computing system of claim 8 wherein the VNVM controls placement of the middlebox virtual machines within the sub-networks by at least one of:
(a) encouraging placement of virtual machines in the same sub-network by making the virtual machines the same size; and
(b) encouraging placement of virtual machines in the same sub-network by instantiating them at the same time.

10. A method of managing a plurality of network connected computers implementing virtual machines and controlled by a cloud application that dynamically allocates virtual machines to different enterprises and monitors costs of the virtual machines against an account for each enterprise; the virtual machines for at least one enterprise including: (1) application virtual machines executing software to implement an application for the enterprise; and (2) middlebox virtual machines executing software enforcing rules related to transport of data between application virtual machines; comprising the steps of:
(1) instantiating at least one virtual network virtual machine (VNVM) executing software to dynamically control a virtual network interconnecting the application virtual machines and middlebox virtual machines; and
(2) operating the VNVM to intercommunicate with the application virtual machines and middlebox virtual machines to control the flow of data therebetween;
(3) using the VNVM to monitor a performance metric of the enterprise to request additional middlebox virtual machines from the cloud application according to that monitoring; and
(4) using the VNVM to monitor a performance metric of the enterprise to determine where among multiple locations to add additional middlebox virtual machines to the enterprise according to that monitoring.

11. The method of claim 10 wherein the VNVM controls the flow between application virtual machines and middlebox virtual machines by inter-communicating with the application virtual machines and middlebox virtual machines to establish tunnels on the network therebetween.

12. The method of claim 11 wherein the tunnels are between application virtual machines and middlebox virtual machines.

13. The method of claim 11 wherein the tunnels are between the VNVM and one of the application virtual machines and metal box virtual machines.

14. The method of claim 10 wherein the performance metric is requests per second handled by at least one application virtual machine.

15. The method of claim 10 further including the steps of using the VNVM to monitor a performance metric of at least one application virtual machine while changing a number of middlebox virtual machines of a given type operating in parallel on a path of data flowing to at least one application virtual machine to determine where to increase a number of middlebox virtual machines on the path to at least one application virtual machine and adding middleboxes according to this determination.

16. The method of claim 10 further including the step of using the VNVM to intercommunicate with the application virtual machines and middlebox virtual machines to provide a splitting of data directed to multiple middlebox applications operating in parallel on a path of data flowing to at least one application virtual machine, the splitting of data preferentially assigning new data flows to a new middlebox until flows to the parallel middleboxes are substantially equal.

17. The method of claim 16 wherein the network connected computers are held in different racks and wherein the splitting of data preferentially assigns data flows to reduce dataflows passing between different racks.

18. The method of claim 10 wherein the plurality of network connected computers are connected in a hierarchy of sub-networks and further including the step of:
- (4) using the VNVM to communicate with the cloud application to control placement of the middlebox virtual machines in particular sub-networks according to at least one of:
- (a) intended connections of middlebox virtual machines to associated application virtual machines on the virtual network so that middlebox virtual machines are close to associated application virtual machines on the physical network;
- (b) predicted scaling required by middlebox virtual machines so that middlebox virtual machines requiring substantial future scaling are separated from other middlebox virtual machines requiring substantial future scaling; and
- (c) a ratio of input to output traffic for middlebox virtual machines so that middlebox virtual machines with a high ratio are close to virtual machines providing input to the middlebox virtual machine with a high ratio.

19. The method of claim 18 wherein the VNVM controls placement of the middlebox virtual machines within the sub-networks by at least one of:
- (a) encouraging placement of virtual machines in the same sub-network by making the virtual machines the same size; and
- (b) encouraging placement of virtual machines in the same sub-network by instantiating them at the same time.

* * * * *